United States Patent [19]
DiMarco

[11] Patent Number: 5,293,581
[45] Date of Patent: Mar. 8, 1994

[54] FLEXIBLE CONNECTOR ASSEMBLY FOR FIBER OPTICS

[75] Inventor: Brian A. DiMarco, Simpsonville, S.C.

[73] Assignee: Alcoa Fujikura Ltd., Brentwood, Tenn.

[21] Appl. No.: 48,808

[22] Filed: Apr. 16, 1993

[51] Int. Cl.⁵ .................................................. G02B 6/36
[52] U.S. Cl. ........................................ 385/76; 385/53; 385/55
[58] Field of Search .............................. 385/76, 50–53, 385/55, 56, 58, 70

[56] References Cited

U.S. PATENT DOCUMENTS

| | | | |
|---|---|---|---|
| 4,953,929 | 9/1990 | Basista et al. | 350/96.2 |
| 5,109,453 | 4/1992 | Edwards et al. | 385/76 X |
| 5,123,071 | 6/1992 | Mulholland et al. | 385/53 |

Primary Examiner—John D. Lee
Assistant Examiner—Phan T. Heartney
Attorney, Agent, or Firm—Elroy Strickland

[57] ABSTRACT

A compact adaptor for holding two individual fiber optic connectors in flexible side-by-side positions for future alignment within a common connector housing. The adaptor comprises two clamp members for engaging the connectors on opposite sides thereof. The clamp members each comprise two shallow U-shaped sections, with each section having a base portion and leg portions integral therewith. A bridge member extends outwardly from the bases and is outwardly bowed such that it can be manipulated by the user of the connectors and adaptor. Such manipulation of the bridge member permits relative movement of the U-shaped sections and thus relative movement of the side-by-side fiber optic connectors in a direction perpendicular to their longitudinal axes.

3 Claims, 2 Drawing Sheets

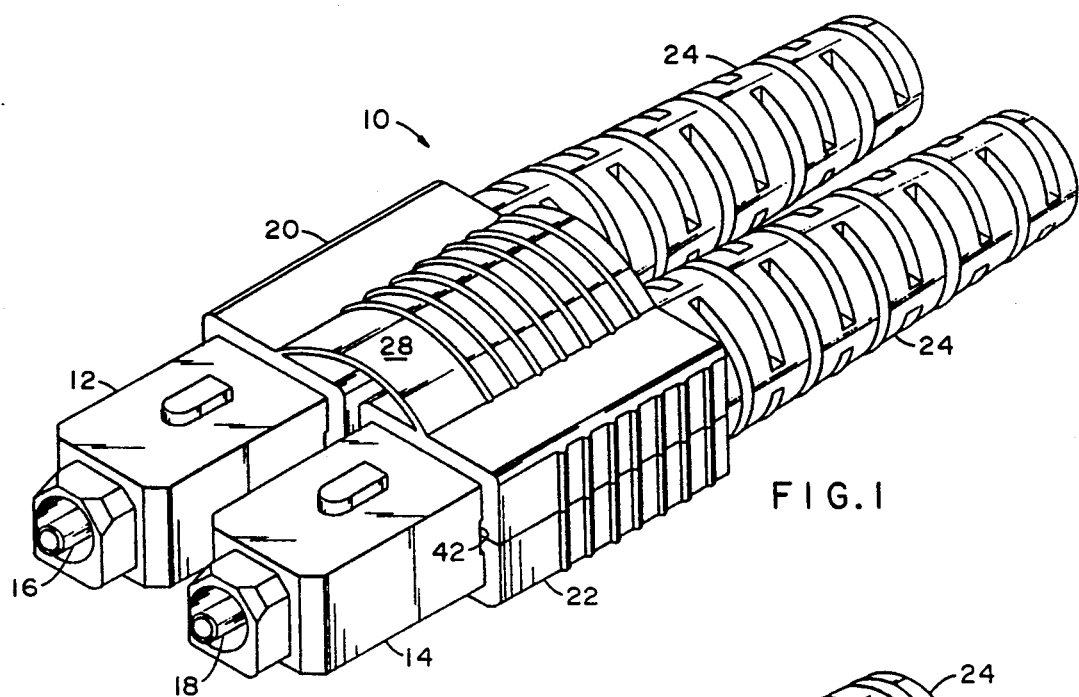
FIG. 1
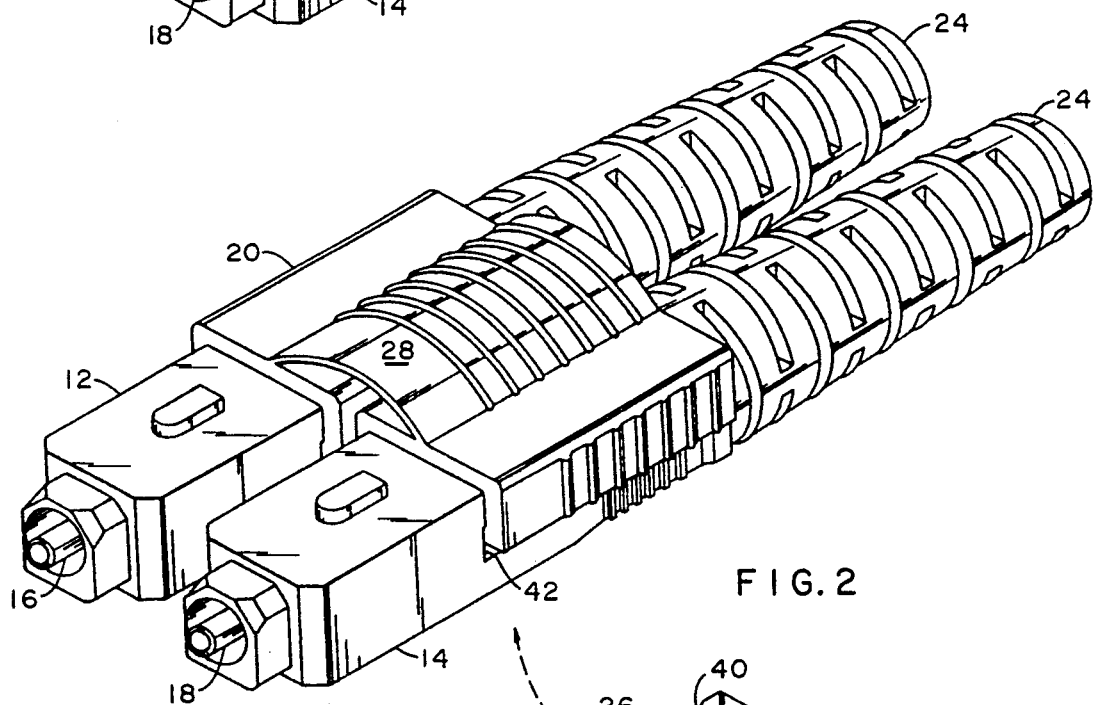
FIG. 2
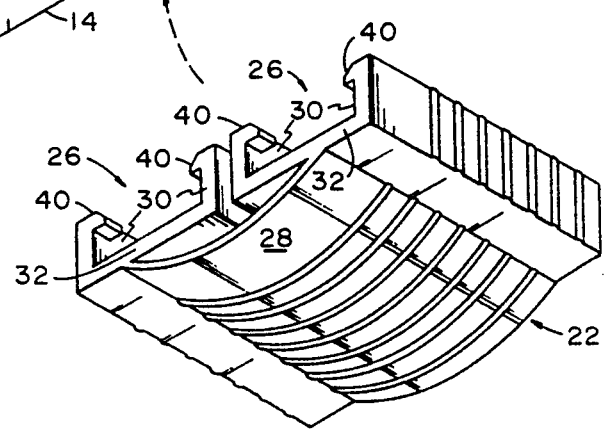

FLEXIBLE CONNECTOR ASSEMBLY FOR FIBER OPTICS

BACKGROUND OF THE INVENTION

The present invention relates generally to fiber optic connectors and particularly to a flexible structure for connecting the connectors together in a side-by-side manner for insertion into a common housing for receiving a second set of fiber optic connectors.

U.S. Pat. No. 4,953,929 to Basista et al discloses an adaptor for holding two fiber optic connector bodies in a side-by-side manner and in a flexible manner that permits four different directions of relative movement between the connector bodies. The four movements are shown in FIGS. 6A through 9B of the patent drawings. The adaptor is located between the side-by-side connector bodies and comprises two C-shaped sections that engage respectfully the connector bodies. The C-shaped sections are connected together by a flexible, foldable web 43. Since the adaptor, including the web, is located between the connectors, a certain amount of space is required between the connectors to accommdate the web.

U.S. Pat. No. 5,123,071 to Mulholland et al shows a connector assembly in which two rigid, E-shaped members 76 and 77 secure two optical fiber connectors in a side-by-side manner, the members being provided with latch means 84 and 85 that connect the two members together about the connectors. This is a substantially rigid assembly that does not allow individual movement of the optical connectors after the E-shaped members are clipped together about the optical connectors.

SUMMARY OF THE INVENTION

It is therefore an objective of the invention to provide a fiber optic assembly which is both compact in size and yet permits a certain resilient movement and flexibility of the connectors such that the ends of the optical fibers within the connector bodies can be easily aligned with the ends of other optical fibers in a common housing or receptacle for optical connection of the optical fibers. This is accomplished with the use of a simple adaptor in the form of a clamp member having two shallow U-shaped sections connected together by an outwardly bowed bridge located on one side of the U-shaped sections. This locates the bowed section outside of the connector bodies so that the connector bodies can be disposed in close proximity to one another in a side-by-side manner. The bowed bridge section permits a certain amount of flexing of the U-shaped members, perpendicular to the longitudinal axes of the connector bodies and fiber optics, such that the connector bodies and their optics can easily be aligned with corresponding optics located in the common housing or receptacle.

The single bowed bridge of the invention, in addition, is easy to manufacture, such as by injection molding, since the overall configuration of the bridge and the connecting U-shaped members are simple structures.

BRIEF DESCRIPTION OF THE DRAWINGS

The advantages and objectives of the invention will be better understood from the following detailed description and the accompanying drawings in which:

FIG. 1 is a greatly enlarged, perspective view of two optical fiber connectors held together in close proximity to each other by two opposed bowed adaptors or clamp members;

FIG. 2 is the same showing as FIG. 1 except that a lower clamp member is removed from the connector bodies to better show its overall configuration.

DETAILED DESCRIPTION OF A PREFERRED EMBODIMENT

Figure 3:
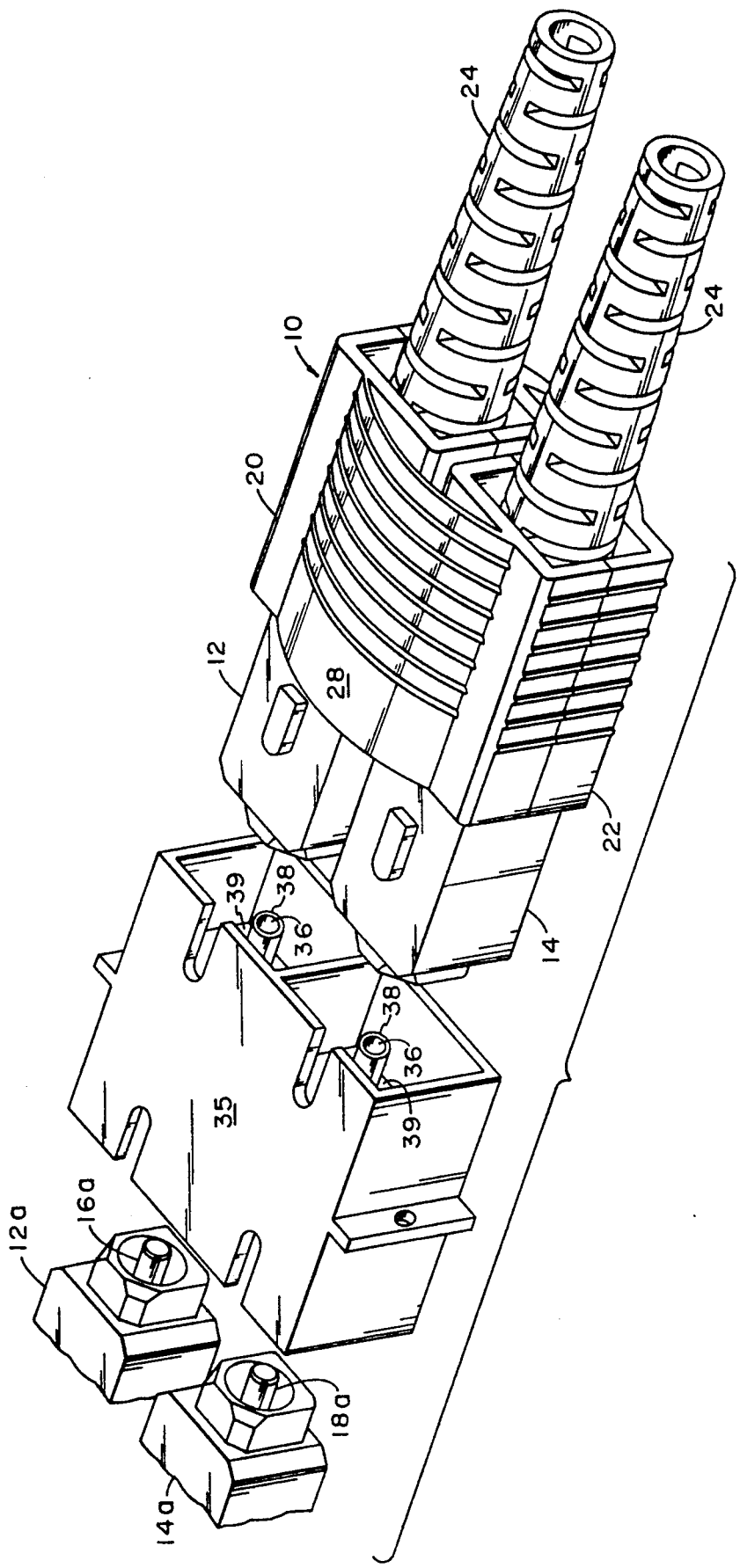
FIG. 3 is a rear perspective view of the connectors of FIGS. 2 and 3, and a common housing for receiving the forward ends of the connectors.

Referring now to the drawings, a compact connector assembly 10 is shown in perspective, the assembly comprising two connector bodies or housings 12 and 14 containing the end portions of two optical fiber termini 16 and 18 respectively. The connector bodies are held together in a side-by-side manner by two compact, upper and lower, clips or clamp adaptors 20 and 22. The connector bodies have respective hollow rearward extensions or boots 24 that provide bend relief for the optical fibers and cable components that extend along the longitudinal axes of the connector bodies and boots.

Referring to FIG. 2 of the drawings, the lower clamp 22 is shown separately from the connector bodies 12 and 14 so that the configuration can be better seen. More particularly, each of the clamps 20 and 22 comprise two side-by-side, closely spaced, shallow, U-shaped portions 26 joined together by a flexible, bowed bridge means 28. The U-shapes of the clamp provide four relatively short legs 30 extending generally perpendicularly from two bases 32, with the bridge means 28 being connected to the bases 32. The bridge, bases, and legs can be integrally formed by injection molding processes in a rapid inexpensive manner if the material of clamps 20 and 22 is an appropriate durable plastic such as Nylon.

When attached to the connectors 12 and 14, the structures of clamps 20 and 22 locate the connector bodies in close proximity to each other to provide a compact assembly (10), as the means that provides the clamp with flexibility, namely, bridge member 28, is located to one side of the assembly. When the assembly is inserted into a receptacle 35 for the purpose of placing the end faces of termini 16 and 18 against the corresponding end faces of optical 16a and 18a (FIG. 3) in the receptacle, bridge 29 allows one to move and orient the individual end faces, via movement of the connector bodies, with receptacle openings 36 containing fiber termini 16a and 18a. The movement is a movement perpendicular to the axes of fibers 16 and 18.

Openings 36 are provided in integral, longitudinally extending sleeves 38 provided in receptacle 35, as shown in FIG. 3. Sleeves 38 can be integrally formed with partitions 39 that divide receptacle 35 into two serially connected compartments. Thus, sleeves 36 protrude from both sides of the partitions and into the compartments with openings 36 extending through the sleeves and partitions. Only one set of the sleeves is visible in FIG. 3. The structure of 35 is also easily made by injection molding processes.

In viewing clamp 22 in FIG. 2, the distal ends of legs 30 have short, integral, inwardly directed extensions 40. These extensions are sized to snap into and engage slotted indentations 42 provided in the sides of connector bodies 12 and 14. In this manner, the clamps secure the connector bodies together in the manner shown in the Figures.

After the connector bodies 12 and 14 are secured together by clamp members 20 and 22, the assembly is inserted into receptacle 35. The ends of fiber optics 16 and 18 enter into the openings 36 of integral sleeves 38 such that the end faces of the optics are located at the approximate mid-distance into the sleeve, which is the location of wall 39. In the process of inserting the connector bodies into receptacle 35, flexible bridges 28 can be pressed between the thumb and forefinger of the workman making the insertion if the ends of fiber optics 16 and 18 are not aligned with the openings 36 of sleeves 38 when the connector bodies are initially inserted. Pressing the bridges moves and manipulates the connector bodies so that the ends of the fiber optics can be easily and quickly aligned with the openings of sleeves 38 and then fully inserted into the sleeves. The same process is performed in inserting a second set of connector bodies 12a and 14a into the other end of receptacle 35, as shown in FIG. 3. With both sets of connector bodies fully inserted into the receptacle, and the optics fully disposed in sleeves 38, the end faces of the optics are disposed in abutment in sleeves 38 so that the transfer of light pulses conducted by and through the optical fibers takes place at the abutting interfaces with a minimum of loss.

While the invention has been described in terms of preferred embodiments, the claims appended hereto are intended to encompass all embodiments which fall within the spirit of the invention.

What is claimed is:

1. A compact adaptor for holding two individual fiber optic connectors in flexible side-by-side positions comprising:
    a clamp member for engaging the connectors, said clamp member comprising two U-shaped sections, each having a base portion and leg portions integral therewith, and adapted to engage respectively the connectors; and
    a bridge member outwardly bowed from the base portions of said U-shaped sections and mechanically connecting said base portions together;
    said bridge member permitting relative movement of the U-shaped sections and thus relative movement of the side-by-side fiber optic connectors in a manner perpendicular to their axes when the clamp member is disposed in engagement with the connectors.

2. A flexible fiber optic connector assembly comprising:
    at least two individual connectors containing optical fibers extending along longitudinal axes of the connectors;
    a first clamp member for engaging the connectors, said member having at least two U-shaped sections comprised of integral bases and leg portions extending from the bases, said leg portions being adapted to engage opposed sides of each connector and hold the same in a side-by-side manner; and
    at least one outwardly bowed bridge means connecting the base portions of each U-shaped sections together;
    said bridge means permitting relative movement of the connectors in directions perpendicular to their longitudinal axes.

3. The assembly of claim 2 including a second clamp member for engaging the connectors, said second clamp member having the same configuration as the first clamp member and being disposed in engagement with the connectors in a manner that locates the second clamp member opposite to that of the first clamp member.

* * * * *